(12) United States Patent
Powell

(10) Patent No.: US 10,796,679 B1
(45) Date of Patent: Oct. 6, 2020

(54) AUTOMATED WIND CHIME

(71) Applicant: Donald F. Powell, Crescent City, FL (US)

(72) Inventor: Donald F. Powell, Crescent City, FL (US)

( * ) Notice: Subject to any disclaimer, the term of this patent is extended or adjusted under 35 U.S.C. 154(b) by 0 days.

(21) Appl. No.: 16/787,219

(22) Filed: Feb. 11, 2020

(51) Int. Cl.
*G10K 1/067* (2006.01)
*H02K 7/06* (2006.01)

(52) U.S. Cl.
CPC .............. *G10K 1/067* (2013.01); *H02K 7/061* (2013.01)

(58) Field of Classification Search
CPC ................................. G10K 1/067; H02K 7/061
See application file for complete search history.

(56) References Cited

U.S. PATENT DOCUMENTS

| | | | |
|---|---|---|---|
| 5,072,208 A | 12/1991 | Christensen | |
| 5,208,578 A | 5/1993 | Tury | |
| 5,369,391 A | 11/1994 | Gadsby | |
| 5,831,516 A * | 11/1998 | Jennings | G08B 3/00 340/392.4 |
| 6,441,284 B1 * | 8/2002 | Greene | G10K 1/072 84/402 |
| 6,495,939 B1 * | 12/2002 | Yamaguchi | H02K 5/00 310/81 |
| 7,405,351 B2 | 7/2008 | Maeng | |
| 7,518,275 B2 * | 4/2009 | Suzuki | B06B 1/045 310/71 |
| 7,679,240 B2 * | 3/2010 | Kono | H02K 5/00 310/81 |
| 7,825,555 B2 * | 11/2010 | Uchiumi | H02K 5/00 310/81 |
| 8,941,252 B1 | 1/2015 | Kuelbs | |
| 2005/0145088 A1 | 7/2005 | Tse | |

* cited by examiner

*Primary Examiner* — Robert W Horn
(74) *Attorney, Agent, or Firm* — Kyle A. Fletcher, Esq.

(57) ABSTRACT

The automated wind chime comprises a housing and a wobble arm. The housing may be suspended from a clapper of a wind chime. A motor within the housing may rotate the wobble arm when energized. The wobble arm may be unbalanced such that rotation of the wobble arm causes the housing to sway in an erratic pattern. Moving the housing in the erratic pattern may cause the clapper to strike a plurality of percussion targets within the wind chime thus producing chime music even in the absence of wind. The housing may have a novelty appearance. As non-limiting examples, the housing may be shaped like a duck, turkey, Easter bunny, Santa Claus, musical note, or flower.

19 Claims, 6 Drawing Sheets

US 10,796,679 B1

AUTOMATED WIND CHIME

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of outdoor percussion instruments, more specifically, an automated wind chime.

SUMMARY OF INVENTION

The automated wind chime comprises a housing and a wobble arm. The housing may be suspended from a clapper of a wind chime. A motor within the housing may rotate the wobble arm when energized. The wobble arm may be unbalanced such that rotation of the wobble arm causes the housing to sway in an erratic pattern. Moving the housing in the erratic pattern may cause the clapper to strike a plurality of percussion targets within the wind chime thus producing chime music even in the absence of wind. The housing may have a novelty appearance. As non-limiting examples, the housing may be shaped like a duck, turkey, Easter bunny, Santa Claus, musical note, or flower.

An object of the invention is to provide a device that moves the clapper of a wind chime in an erratic pattern, even in the absence of wind.

Another object of the invention is to provide a device comprising a housing that has a novelty appearance.

A further object of the invention is to provide a motor-driven wobble arm to cause erratic movement of the housing.

Yet another object of the invention is to provide a power control for turning the motor off and on and for setting a rotational speed of the motor.

These together with additional objects, features and advantages of the automated wind chime will be readily apparent to those of ordinary skill in the art upon reading the following detailed description of the presently preferred, but nonetheless illustrative, embodiments when taken in conjunction with the accompanying drawings.

In this respect, before explaining the current embodiments of the automated wind chime in detail, it is to be understood that the automated wind chime is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated wind chime.

It is therefore important that the claims be regarded as including such equivalent construction insofar as they do not depart from the spirit and scope of the automated wind chime. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
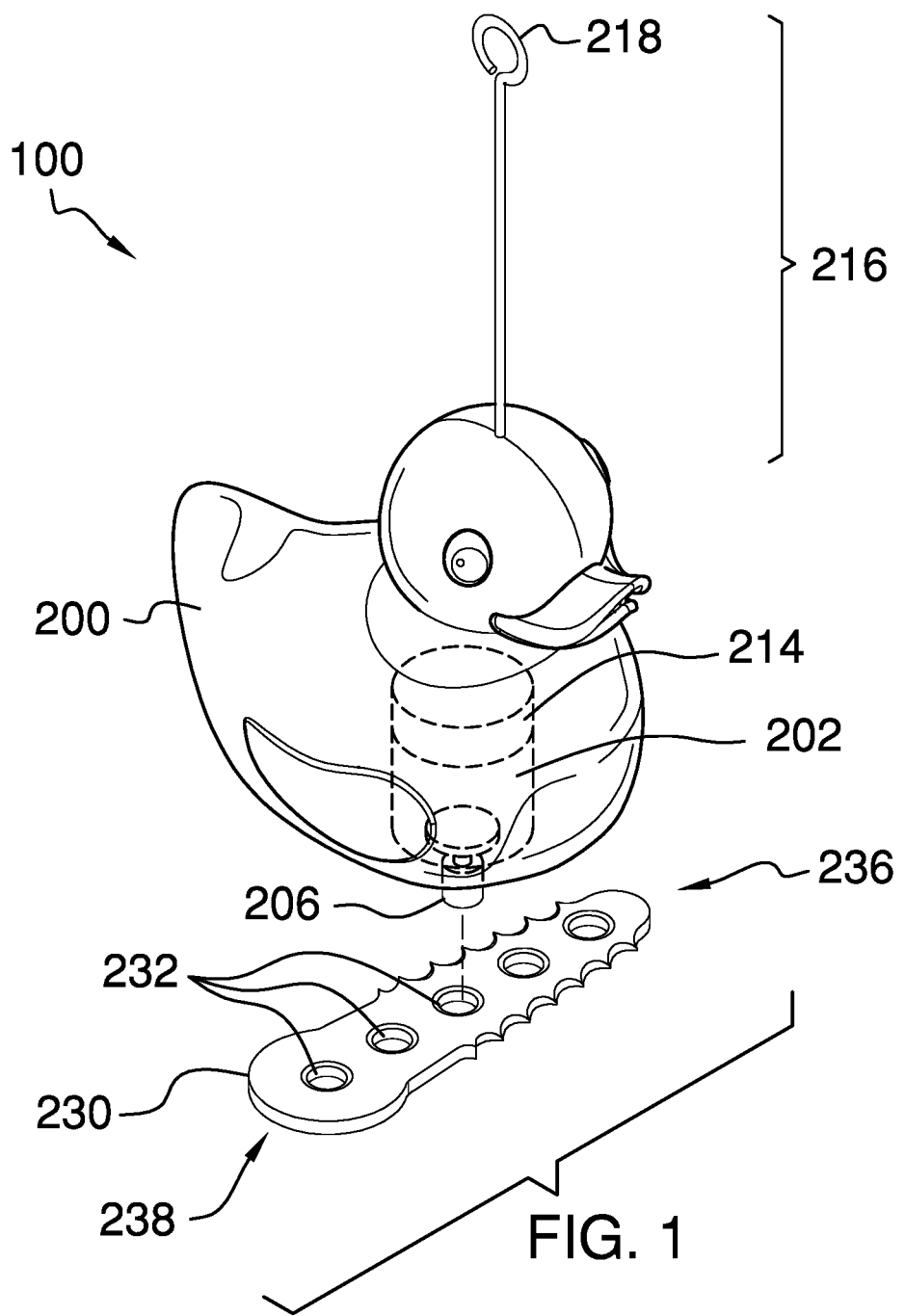
FIG. 1 is an isometric view of an embodiment of the disclosure.
Figure 2:
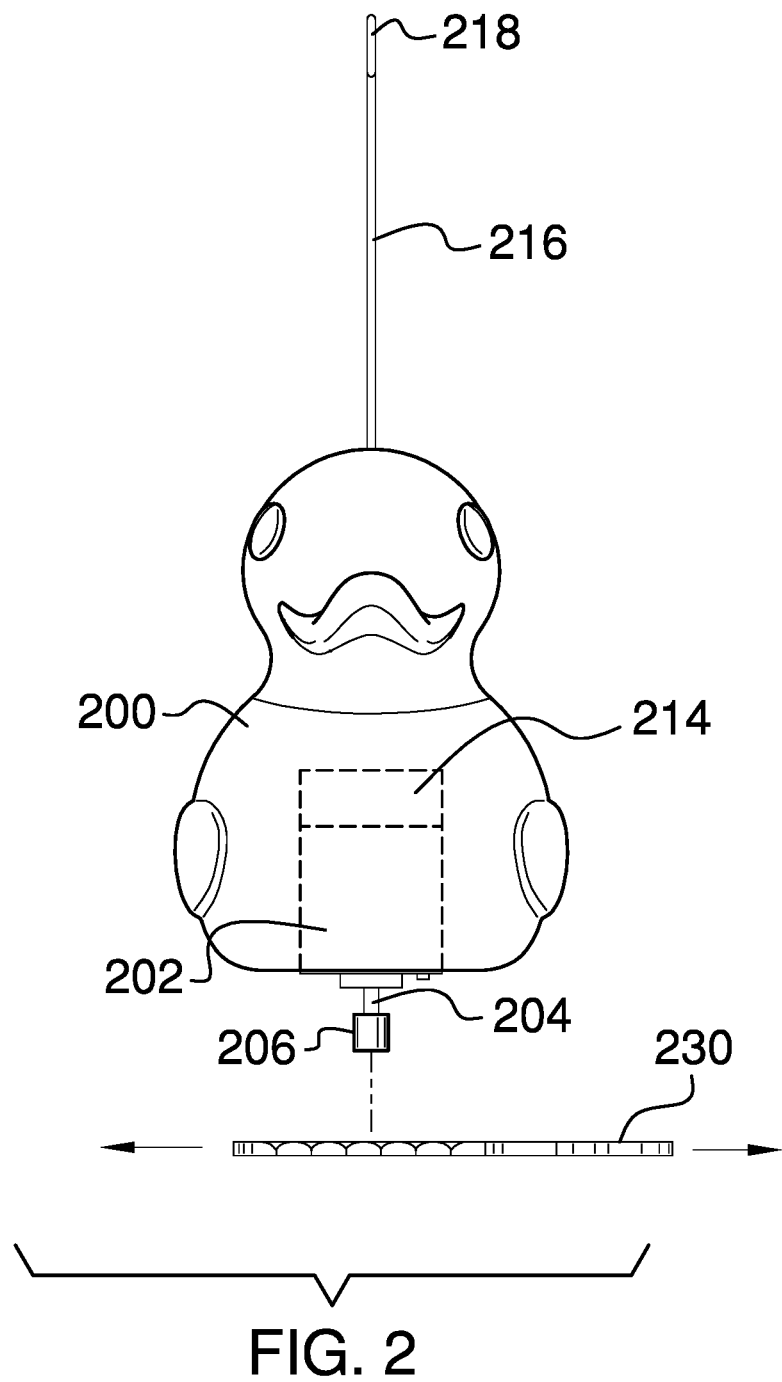
FIG. 2 is a front view of an embodiment of the disclosure.
Figure 3:
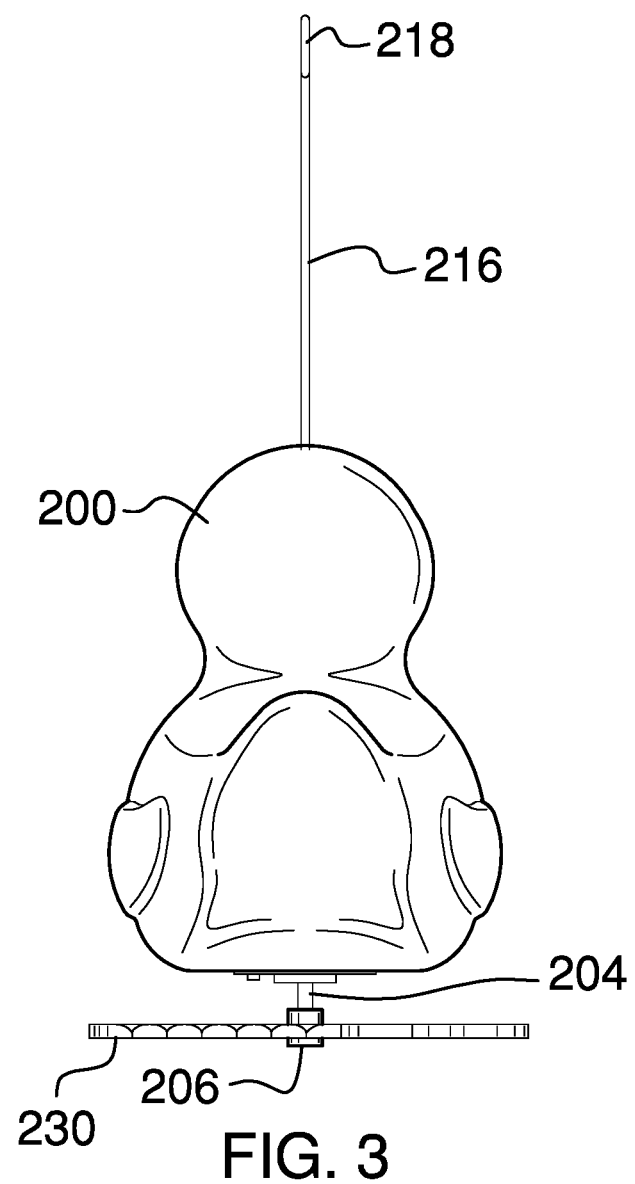
FIG. 3 is a rear view of an embodiment of the disclosure.
Figure 4:
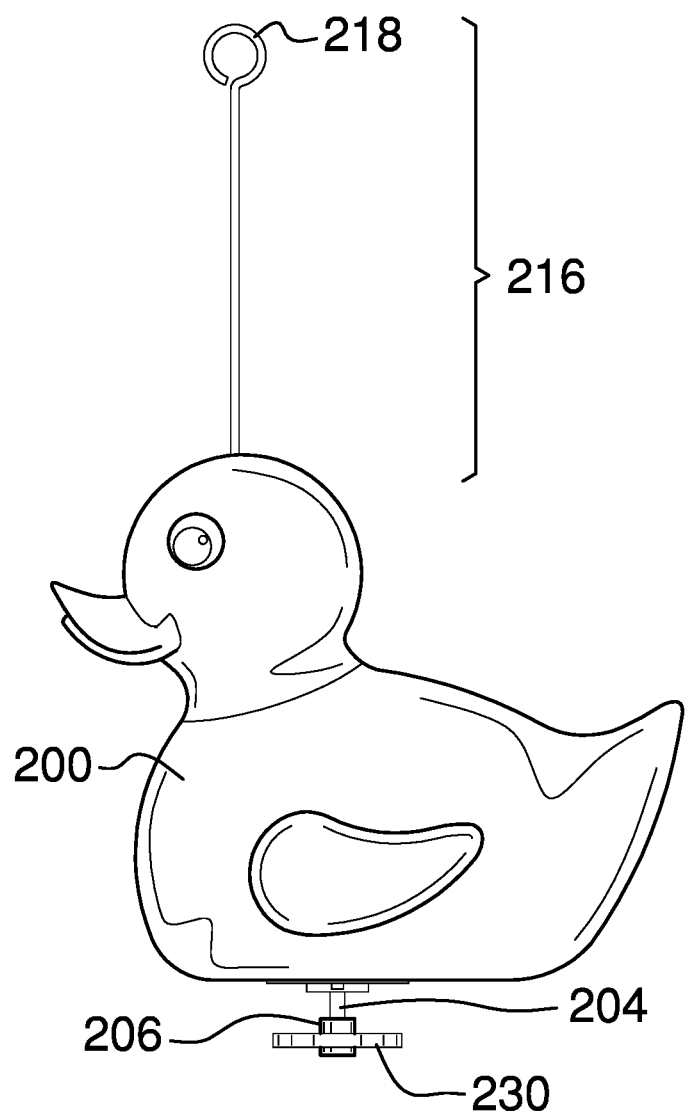
FIG. 4 is a side view of an embodiment of the disclosure.
Figure 5:
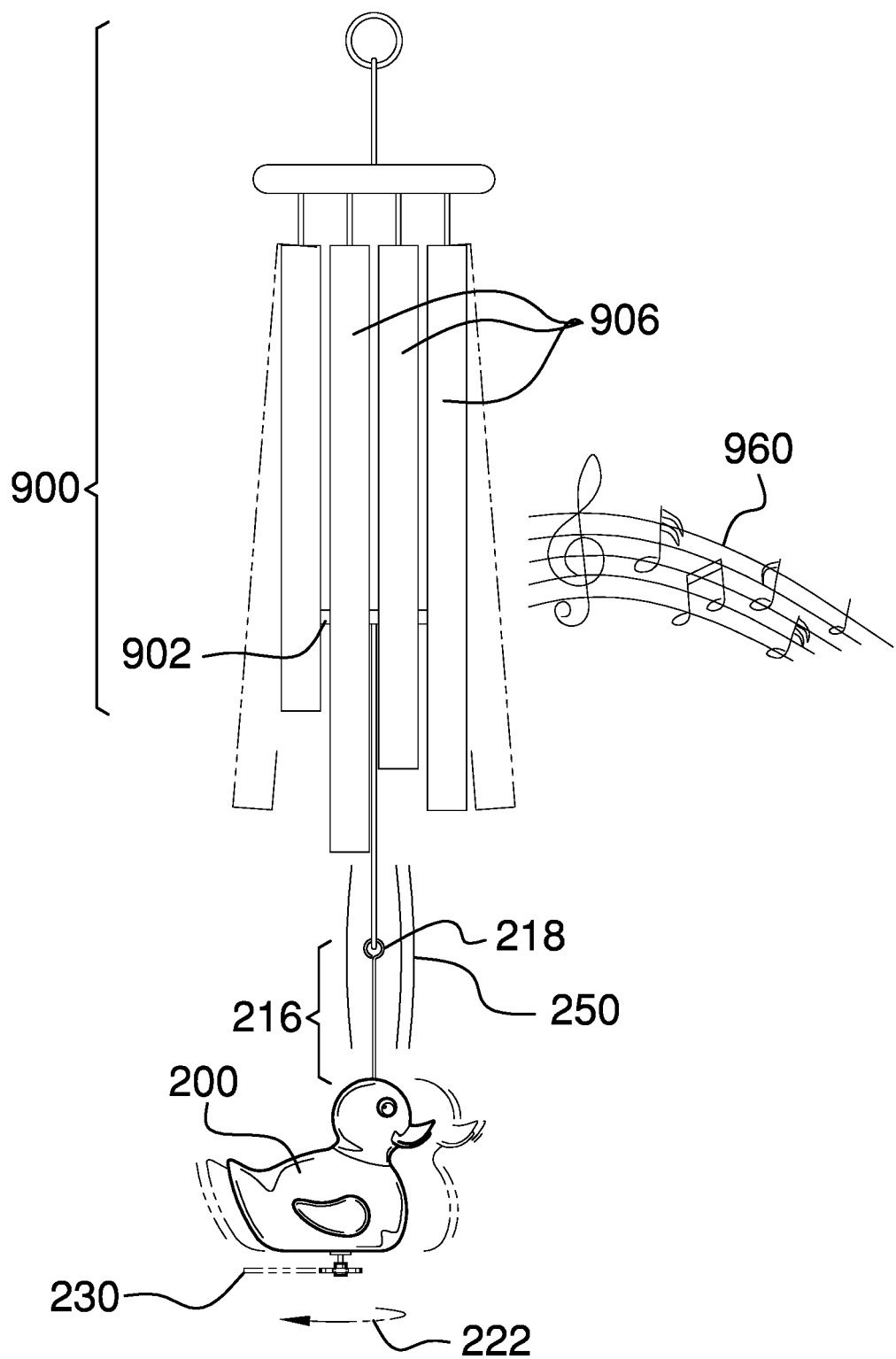
FIG. 5 is an in-use view of an embodiment of the disclosure.
Figure 6:
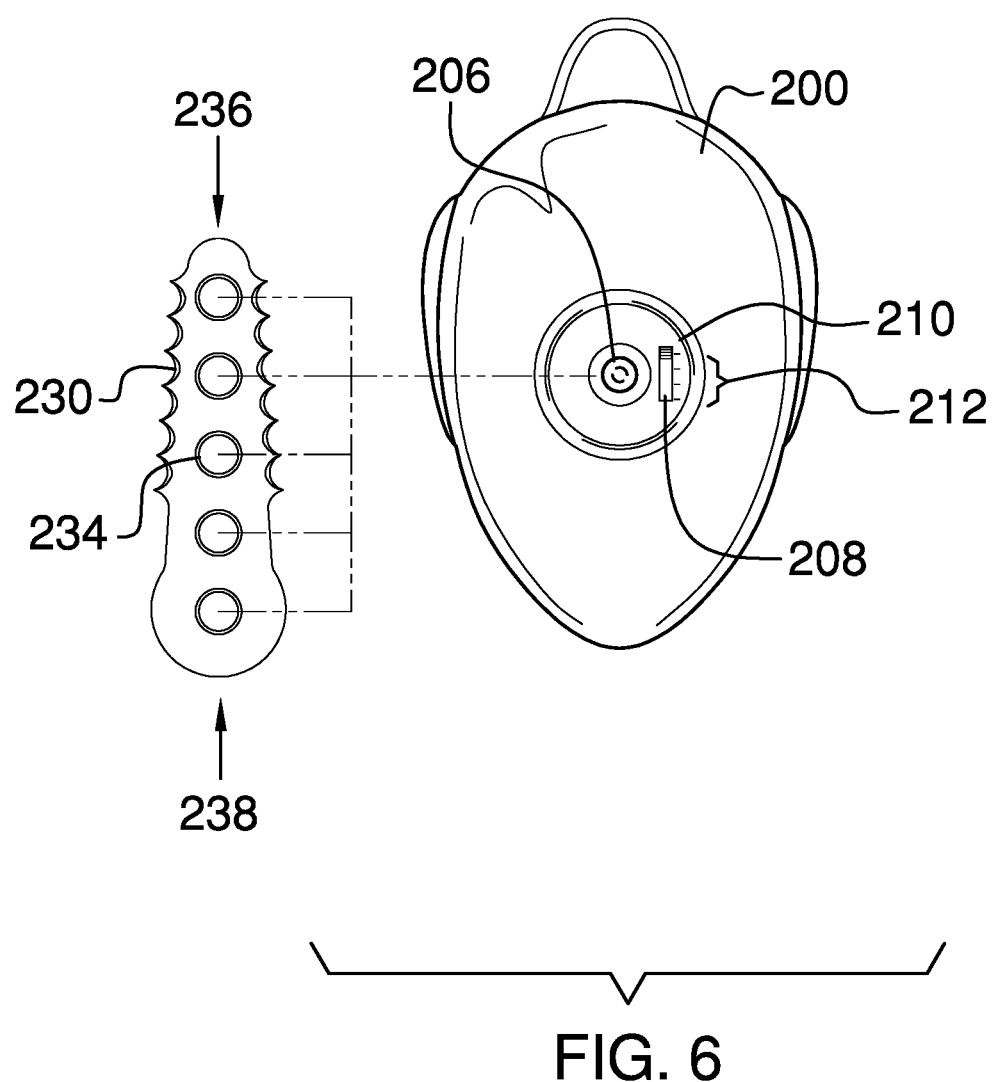
FIG. 6 is a bottom view of an embodiment of the disclosure.

Detailed reference will now be made to a first potential embodiment of the disclosure, which is illustrated in FIGS. 1 through 6.

The automated wind chime 100 (hereinafter invention) comprises a housing 200 and a wobble arm 230. The housing 200 may be suspended from a clapper 902 of a wind chime 900. A motor 202 within the housing 200 may rotate the wobble arm 230 when energized. The wobble arm 230 may be unbalanced such that rotation of the wobble arm 230 causes the housing 200 to sway in an erratic pattern 250. Moving the housing 200 in the erratic pattern 250 may cause the clapper 902 to strike a plurality of percussion targets 906 within the wind chime 900 thus producing chime music 960 even in the absence of wind.

The housing 200 may be an enclosure for the motor 202, one or more batteries 214, and a power control 208. The housing 200 may comprise the motor 202, the power control 208, the one or more batteries 214, and a hanger 216. The housing 200 may have a novelty appearance. As non-limiting examples, the housing 200 may be shaped like a duck, turkey, Easter bunny, Santa Claus, musical note, or flower.

The motor 202 may be mounted within the housing 200 such that a motor shaft 204 is vertically oriented. The motor shaft 204 may project from the bottom of the housing 200. The bottom end of the motor shaft 204 may be terminated by an arm coupler 206. The arm coupler 206 may detachably couple the motor shaft 204 to the wobble arm 230 such that rotation of the motor shaft 204 causes rotation of the wobble arm 230.

The power control 208 may control when the motor 202 is energized. The power control 208 may further control the degree of the energization. The power control 208 may comprise an off position 210 and one or more speed selection positions 212. When the power control 208 is placed into the off position 210 may deenergize the motor 202 and may stop rotation of the motor shaft 204. When the power control 208 is placed into one of the one or more speed selection positions 212 may energize the motor 202 and may select a rotational speed 222.

The one or more batteries 214 may comprise one or more energy-storage devices. The one or more batteries 214 may be a source of electrical energy to operate the motor 202. The one or more batteries 214 may be replaceable or rechargeable.

The hanger 216 may comprise a hook 218. The hanger 216 may extend upwards from the top of the housing 200. The top end of the hanger 216 may be terminated by the hook 218. The hook 218 may detachably couple to the clapper 902 of the wind chime 900, either directly or indirectly. As non-limiting examples, the hook 218 may couple to the clapper 902, to a sail suspended below the clapper 902, or to a string hanging from the clapper 902 in place of the sail.

The wobble arm 230 may be a weight that detachably couples to the arm coupler 206 that is located at the bottom end of the motor shaft 204. The wobble arm 230 may comprise a plurality of adjustment apertures 232 for the purpose of coupling. As a non-limiting example, the coupling between an individual adjustment aperture 234 selected from the plurality of adjustment apertures 232 and the arm coupler 206 may be a press-fit. The distribution of the weight of the wobble arm 230 may be unbalanced at the arm coupler 206 such that rotation of the wobble arm 230 may cause the wobble arm 230 to wobble. The unbalanced weight may be due to the selection of the individual adjustment aperture 234 where the arm coupler 206 meets the wobble arm 230. As a non-limiting example, the individual adjustment aperture 234 may not coincide with the center of gravity of the wobble arm 230.

In some embodiments, the wobble arm 230 may be asymmetrical relative to a longitudinal axis, asymmetrical relative to a lateral axis, or both. Asymmetry may further imbalance the wobble arm 230 at the coupling point. As a non-limiting example, a first end 236 of the wobble arm 230 may be narrower than a second end 238 of the wobble arm 230.

The erratic pattern 250 of movement may determine the chime music 960 that is played in that each variation of the erratic pattern 250 may result in a different sequence of the clapper 902 striking the plurality of percussion targets 906, a different intensity of strikes against the plurality of percussion targets 906, or both. The erratic pattern 250 may be varied by moving the arm coupler 206 between the plurality of adjustment apertures 232. Use of each of the individual adjustment apertures 234 selected from the plurality of adjustment apertures 232 may result in a different degree of imbalance of the wobble arm 230 and therefore a variation of the erratic pattern 250. The erratic pattern 250 may be varied by changed the rotational speed 222 of the wobble arm 230 by selecting the one or more speed selection positions 212 of the power control 208. Each of the one or more speed selection positions 212 may result in a variation of the erratic pattern 250. Both the one or more speed selection positions 212 and position of the arm coupler 206 in the plurality of adjustment apertures 232 may be changed simultaneously to change the erratic pattern 250.

In use, a housing 200 may be suspended beneath a clapper 902 of a wind chime 900 by coupling a hook 218 of a hanger 216 to the clapper 902, either directly or indirectly. With a power control 208 in an off position 210, the housing 200 may act as a sail and may move the clapper 902 as the wind blows. In situations where the wind is insufficient to move the clapper 902, the power control 208 may be moved to one of the one or more speed selection positions 212 to energize a motor 202. The motor 202 may rotate a wobble arm 230 and rotation of the wobble arm 230 may cause the housing 200 to gyrate in an erratic pattern 250 due to an imbalance of the wobble arm 230. As the housing 200 moves in the erratic pattern 250, the housing 200 may cause the clapper 902 to also move in the erratic pattern 250, striking a plurality of percussion targets 906 and playing chime music 960. The chime music 960 may be changed by varying the one or more speed selection positions 212 selected by the power control 208 and/or by moving the point of attachment of an arm coupler 206 to the wobble arm 230 to another of a plurality of adjustment apertures 232.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", may refer to connecting, either directly or indirectly, and does not necessarily imply a mechanical connection.

As used herein, "energize" and/or "energization" refer to the application of an electrical potential to a system or subsystem.

As used in this disclosure, a "hook" is an object that is curved or bent at an angle such that items can be hung on or caught by the object or such that the object may be suspended from another object.

As used in this disclosure, a "housing" is a rigid or semi-rigid casing that encloses and protects one or more devices.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used in this disclosure, a "motor" refers to a device that transforms energy from an external power source into mechanical energy.

As used herein, "novelty appearance" refers to an object having a shape and coloring that may be unusual, decorative, and non-functional.

As a non-limiting example, a coin purse shaped like a slice of watermelon may have a novelty appearance.

As used in this disclosure, a "switch" is an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automated wind chime comprising:
a housing and a wobble arm;
wherein the housing is suspended from a clapper of a wind chime;
wherein a motor within the housing rotates the wobble arm when energized;
wherein the wobble arm is unbalanced such that rotation of the wobble arm causes the housing to sway in an erratic pattern;
wherein moving the housing in the erratic pattern causes the clapper to strike a plurality of percussion targets within the wind chime thus producing chime music even in the absence of wind.

2. The automated wind chime according to claim 1
wherein the housing is an enclosure for the motor, one or more batteries, and a power control;
wherein the housing comprises the motor, the power control, the one or more batteries, and a hanger.

3. The automated wind chime according to claim 2
wherein the housing has a novelty appearance.

4. The automated wind chime according to claim 2
wherein the motor is mounted within the housing such that a motor shaft is vertically oriented;
wherein the motor shaft projects from the bottom of the housing.

5. The automated wind chime according to claim 4
wherein the bottom end of the motor shaft is terminated by an arm coupler;
wherein the arm coupler detachably couples the motor shaft to the wobble arm such that rotation of the motor shaft causes rotation of the wobble arm.

6. The automated wind chime according to claim 5
wherein the power control controls when the motor is energized;
wherein the power control further controls the degree of the energization;
wherein the power control comprises an off position and one or more speed selection positions;
wherein when the power control is placed into the off position deenergizes the motor and stops rotation of the motor shaft;
wherein when the power control is placed into one of the one or more speed selection positions energizes the motor and selects a rotational speed.

7. The automated wind chime according to claim 6
wherein the one or more batteries comprise one or more energy-storage devices;
wherein the one or more batteries are a source of electrical energy to operate the motor;
wherein the one or more batteries are replaceable or rechargeable.

8. The automated wind chime according to claim 7
wherein the hanger comprises a hook;
wherein the hanger extends upwards from the top of the housing.

9. The automated wind chime according to claim 8
wherein the top end of the hanger is terminated by the hook;
wherein the hook detachably couples to the clapper of the wind chime, either directly or indirectly.

10. The automated wind chime according to claim 9
wherein the wobble arm is a weight that detachably couples to the arm coupler that is located at the bottom end of the motor shaft;
wherein the wobble arm comprises a plurality of adjustment apertures for the purpose of coupling.

11. The automated wind chime according to claim 10
wherein the coupling between an individual adjustment aperture selected from the plurality of adjustment apertures and the arm coupler is a press-fit.

12. The automated wind chime according to claim 10 wherein the distribution of the weight of the wobble arm is unbalanced at the arm coupler such that rotation of the wobble arm causes the wobble arm to wobble.

13. The automated wind chime according to claim 12 wherein the unbalanced weight is due to the selection of the individual adjustment aperture where the arm coupler meets the wobble arm.

14. The automated wind chime according to claim 13 wherein the individual adjustment aperture does not coincide with the center of gravity of the wobble arm.

15. The automated wind chime according to claim 12 wherein the wobble arm is asymmetrical relative to a longitudinal axis, asymmetrical relative to a lateral axis, or both;
wherein asymmetry further imbalances the wobble arm at the coupling point.

16. The automated wind chime according to claim 15 wherein a first end of the wobble arm is narrower than a second end of the wobble arm.

17. The automated wind chime according to claim 15 wherein the erratic pattern of movement determines the chime music that is played in that each variation of the erratic pattern results in a different sequence of the clapper striking the plurality of percussion targets, a different intensity of strikes against the plurality of percussion targets, or both.

18. The automated wind chime according to claim 17 wherein the erratic pattern is varied by moving the arm coupler between the plurality of adjustment apertures;
wherein use of each of the individual adjustment apertures selected from the plurality of adjustment apertures results in a different degree of imbalance of the wobble arm and therefore a variation of the erratic pattern.

19. The automated wind chime according to claim 18 wherein the erratic pattern is varied by changed the rotational speed of the wobble arm by selecting the one or more speed selection positions of the power control;
wherein each of the one or more speed selection positions result in a variation of the erratic pattern.

* * * * *